Oct. 6, 1970  H. PYPTIUK  3,532,304
ROCKET-POWERED SPACE VEHICLES
Filed Jan. 13, 1967  5 Sheets-Sheet 1
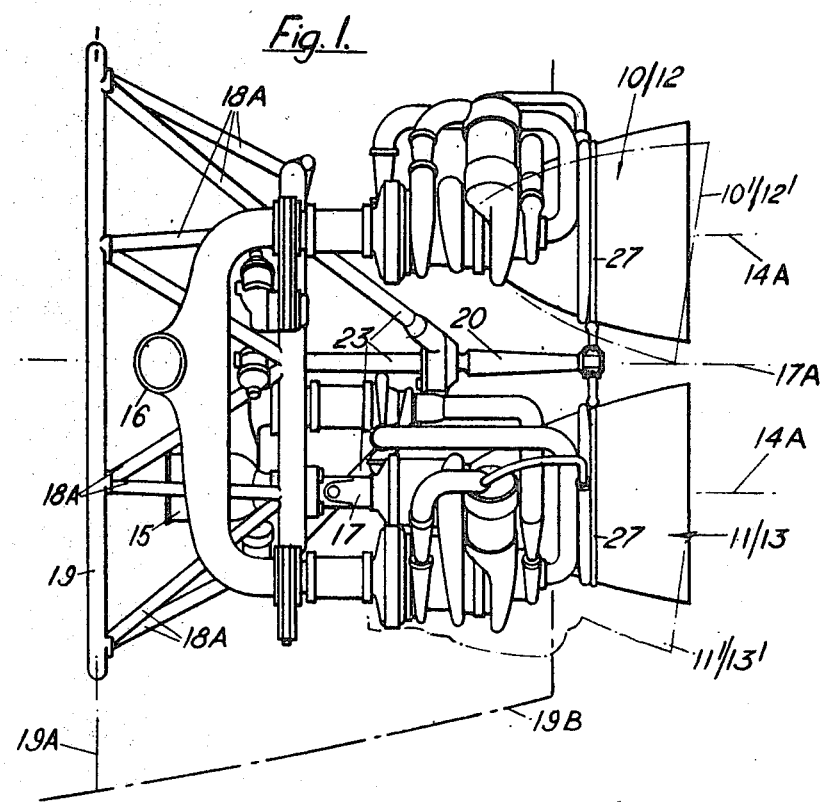
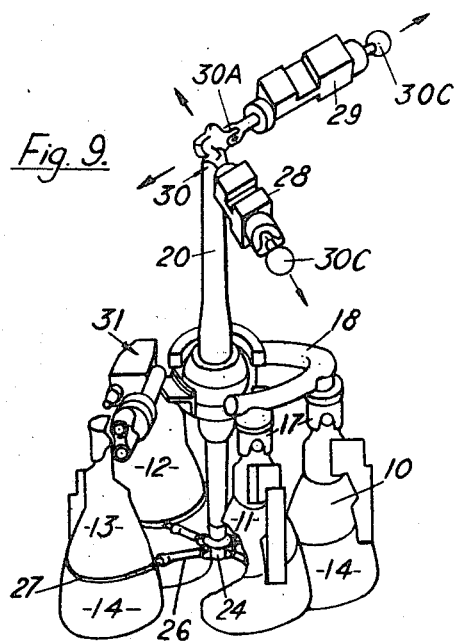
Inventor
HENRYK PYPTIUK
By
Bailey, Stephens & Huettig
Attorney Oct. 6, 1970　　　　　　　　H. PYPTIUK　　　　　　　3,532,304
ROCKET-POWERED SPACE VEHICLES
Filed Jan. 13, 1967　　　　　　　　　　　　　　　5 Sheets-Sheet 2
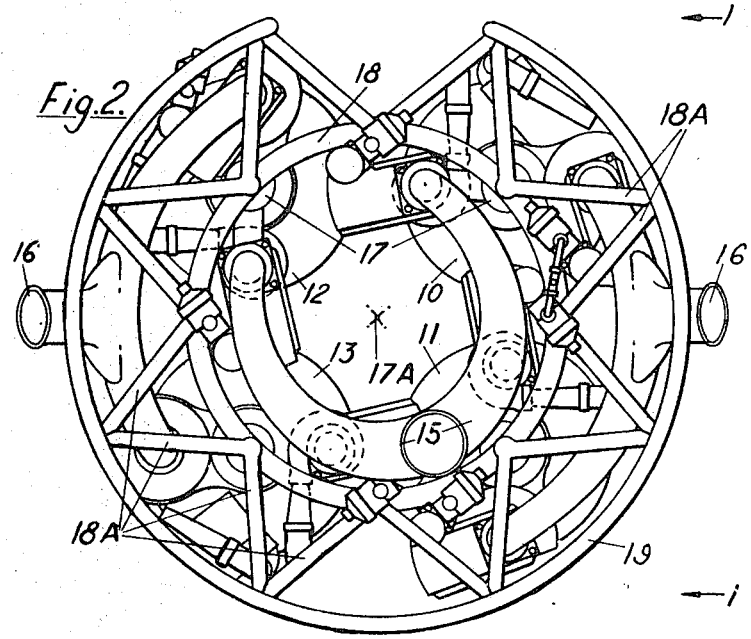
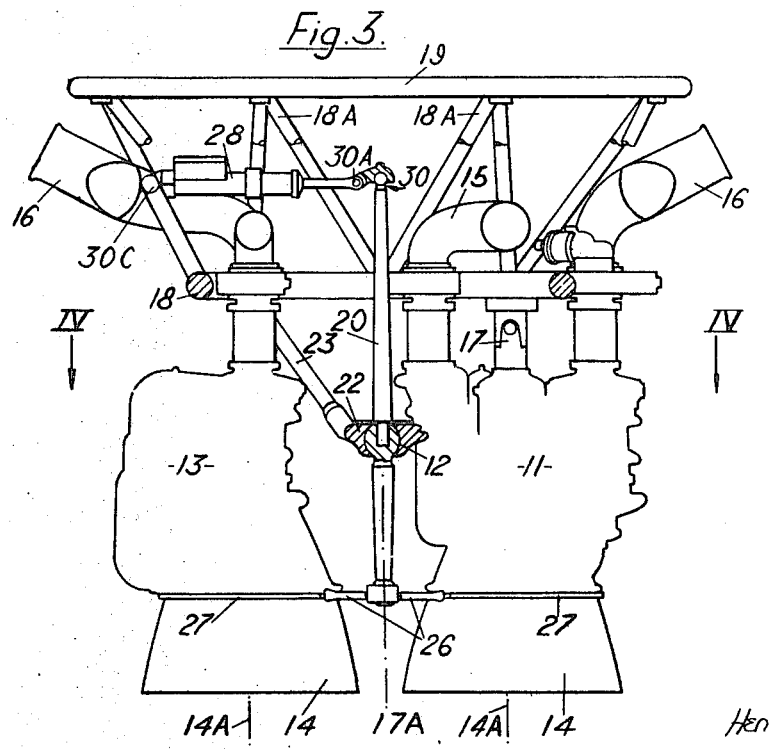
Inventor
HENRYK PYPTIUK
By
Bailey, Stephens & Huettig
Attorney

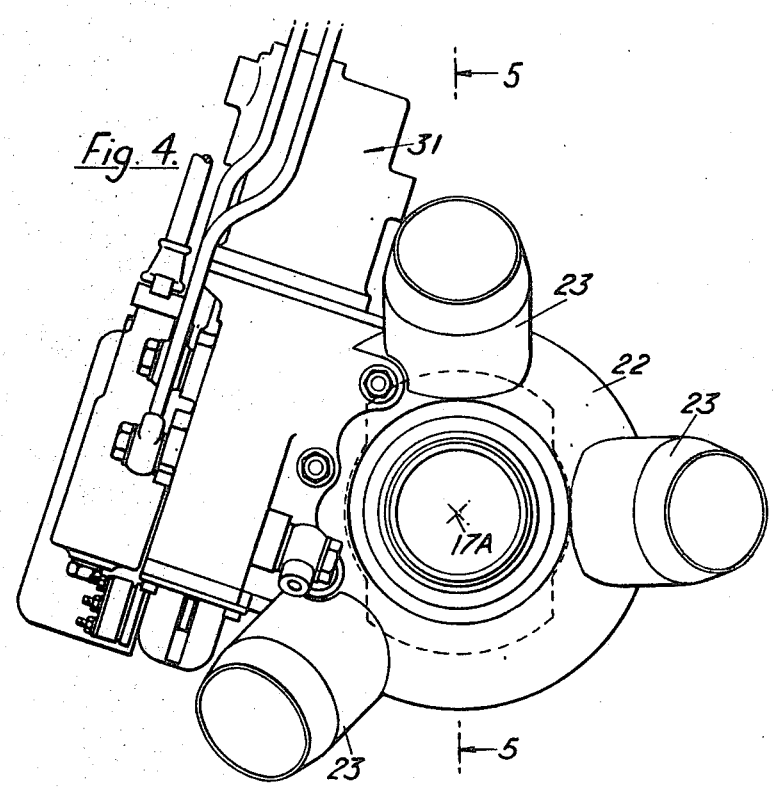
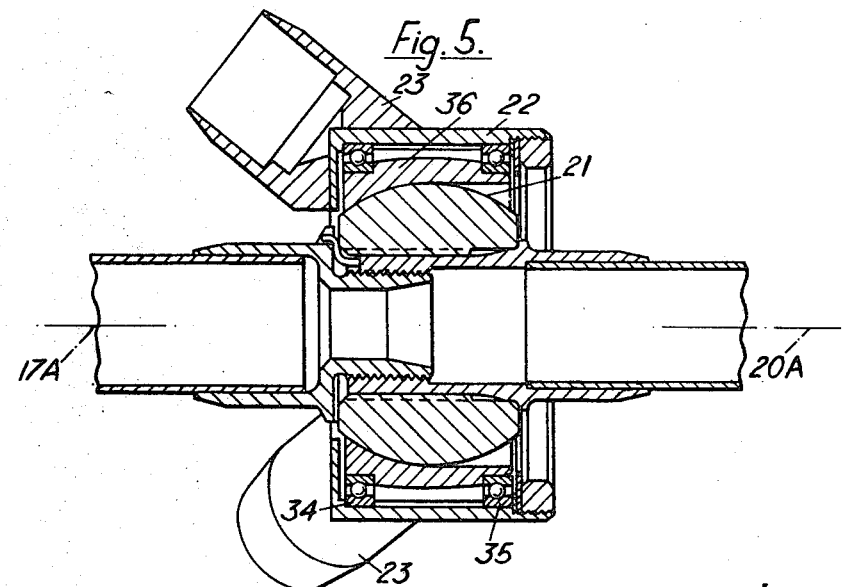

Inventor
HENRYK PYPTIUK
By
Bailey, Stephens+Huettig
Attorney

United States Patent Office 3,532,304
Patented Oct. 6, 1970

3,532,304
ROCKET-POWERED SPACE VEHICLES
Henryk Pyptiuk, Preston, England, assignor to British Aircraft Corporation (Operating) Limited, London, England, a British company
Filed Jan. 13, 1967, Ser. No. 609,117
Claims priority, application Great Britain, Jan. 17, 1966, 2,139/66
Int. Cl. B64c 15/02
U.S. Cl. 244—52                                                 6 Claims

ABSTRACT OF THE DISCLOSURE

An aerial and space vehicle has four rocket motors equally spaced around the roll axis of the vehicle universally mounted thereon on a common frame. A rod mounted at its center for universal movement with respect to the frame is connected by links to each of the motors. Means are provided by rocking the rod in two different directions to cause movement of the motors about the pitch and yaw axes respectively, and means are also provided for rotating the rod for producing pivotal movement of the motors around the roll axes.

---

This invention relates to aerial and space vehicles of the kind in which stability and control about the pitch, yaw and roll axes is achieved by pivoting at least two motors to vary their direction of thrust.

Vehicles of this kind have heretofore required two actuators for each pivotable rocket motor and it is the main object of this invention to reduce the total number of actuators required.

According to the present invention a power plant for a rocket-powered vehicle comprises at least one rocket motor on each side of a plane continuing the roll axis of the vehicle, a connection between each motor and a fixed part of the vehicle, each connection permitting pivotal movement of the associated motor about both the pitch and yaw axes of the vehicle, means connecting the motors together for pivotal movement about one or both of the pitch and yaw axes on appropriate displacement of the connecting means, and for pivotal movement of the axes of the motors together in the same rotational sense around the roll axis of the vehicle on rotation of the connecting means, and three actuators, the first and second for effecting pivotal movement of the motors about the pitch and yaw axes respectively and the third for effecting pivotal movement around the roll axis of the vehicle.

Preferably there are two motors on each side of the plane containing the roll axis, the four motors being equally angularly spaced about the roll axis.

The connecting means may comprise a generally longitudinally extending structure substantially along the roll axis of the vehicle, which structure is mounted for universal movement intermediate its ends, one end of the structure having a substantially radially extending arm for each motor, pivotally connected thereto at one end about an axis such that the arm may pivot in a plane containing the axis of the structure, the other end of each arm being connected to its associated motor for pivotal movement in at least said plane containing the structure axis. Two of the actuators act on the other end of the structure at right angles to each other and to the structure axis. The third actuator is mounted so as to be operative to rotate the structure about its axis.

Further features of the invention will be apparent from the following description of one embodiment of the invention reference being made to the accompanying diagramatic drawings in which:

FIG. 1 is a side elevation of a rocket motor cluster which would be mounted at the rear of a space vehicle and is a view in the direction of arrows 1—1 of FIG. 2;

FIG. 2 is a view looking toward the rear of the vehicle, certain central parts being omitted;

FIG. 3 is a plan view of the rocket motor cluster locally sectioned on a central plane to show the actuation principle, certain parts being omitted for clarity and certain parts shown in outline;

FIG. 4 is an enlarged view of a detail of FIG. 3 in the direction of arrows IV;

FIG. 5 is a sectional elevational on line V—V of FIG. 4;

Figure 6:
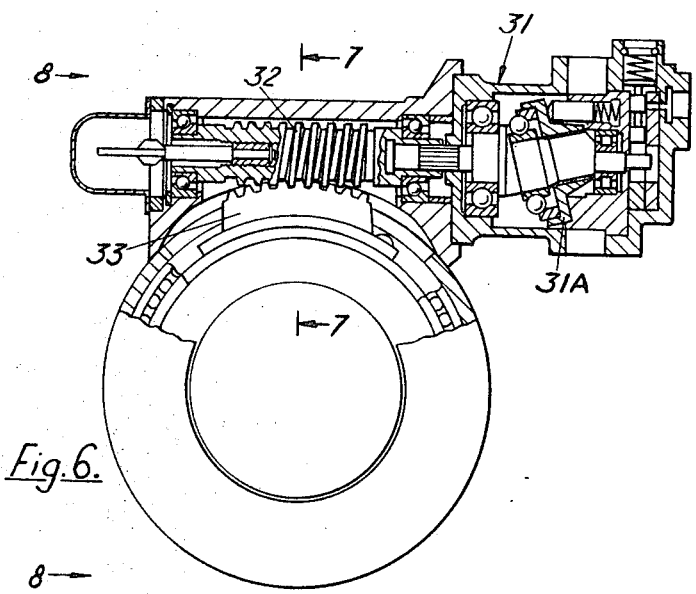
FIG. 6 is a sectional elevation on line VI—VI of FIG. 8.
Figure 7:
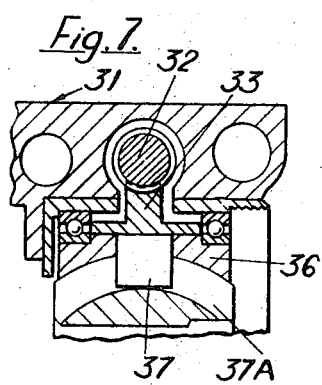
FIG. 7 is a part section elevation on line VII—VII of FIG. 6.
Figure 8:
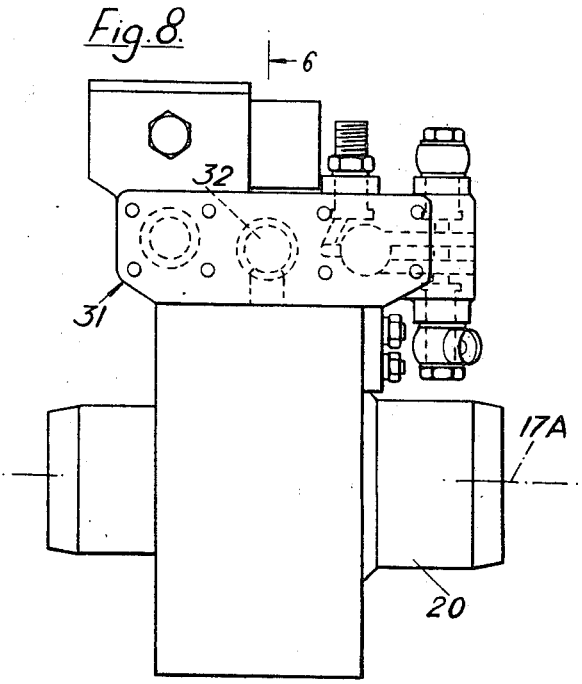
FIG. 8 is a view in the direction of arrows VIII of FIG. 6.
Figure 10:
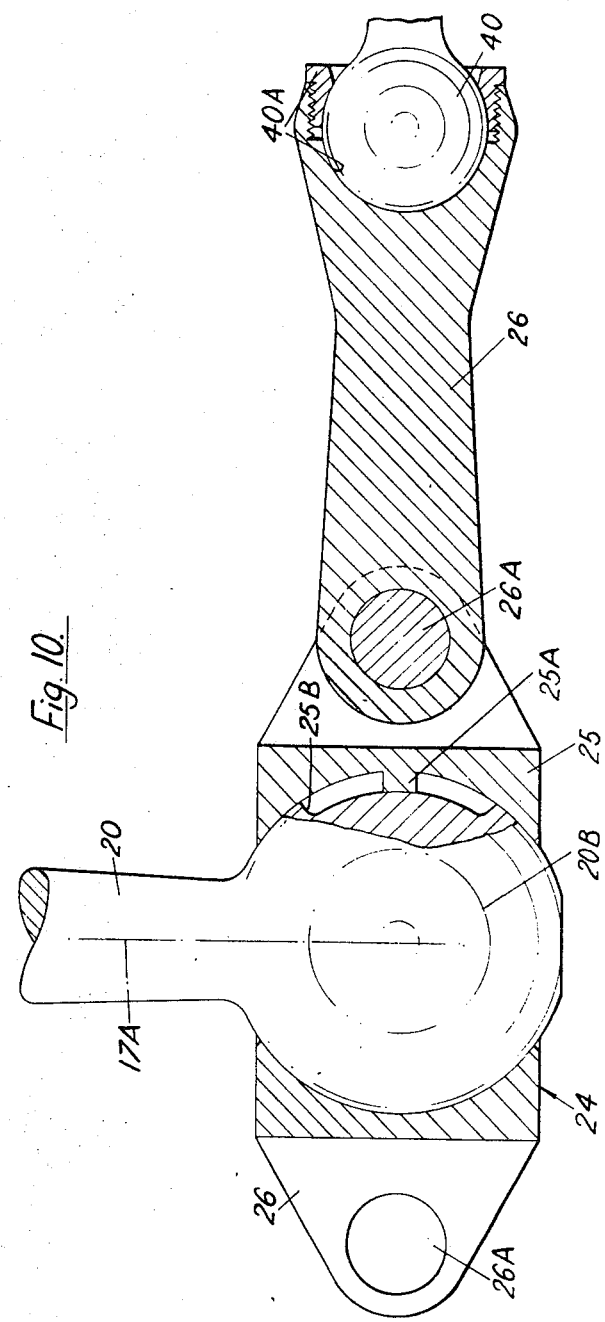

FIG. 9 diagrammatically shows the disposition of the rocket motors within the cluster, and the associated control actuators; and FIG. 10 shows on an enlarged scale a part of the connection between each motor and the longitudinally extending structure.

Referring now to FIGS. 1, 2 and 3, four rocket motors, 10, 11, 12 and 13 each have a nozzle 14 and are supplied with oxygen and hydrogen through manifolds 15 and 16 respectively. The motors 10, 11, for example, are located on one side of a vertical plane (FIG. 2) containing the roll axis 17A while the motors 12, 13 are located on the opposite side of such plane. Each motor is separately mounted by means of a coupling 17 to a tubular thrust ring 18 constituting a frame, and the axis 14A of each motor can be pivoted in any direction within limits with respect to the longitudinal roll axis 17A FIGS. 1 and 5 of the vehicle. The coupling 17 permits pivoting of the associated motor about the pitch and yaw axes of the vehicle. The coupling may be a ball and socket joint. All the thrust from the motors is passed to the thrust ring 18 via the joints 17.

The thrust ring 18 is attached by a rigid tubular structure, parts of which are indicated at 18A, to a mounting ring 19, which in turn is rigidly attached by means not shown to the rear bulkhead 19A (FIG. 1) of the space vehicle 19B.

FIGS. 1, 3 and 9 illustrate the arrangement whereby the angle of the motors can be controlled to steer or stabilise the space vehicle about the pitch, yaw and roll axes. The arrangement consists essentially of a shaft or pylon 20 having a part-spherical surface 21 located towards its midpoint which is seated in a housing 22. The pylon 20 is thus mounted between its ends for universal movement. The housing 22 is cantilevered from the thrust ring 18 by means of three tubular members 23. The longitudinal axis 20A of the pylon 20 is located substantially co-incident with the roll axis 17A of the space vehicle.

Attached to one extremity of the pylon 20 is a cruciform member 24 (FIG. 10) which consists of a central boss 25 and four arms 26 pivotally connected thereto about axes 26A offset from and at right angles to the axes 17A and 20A. The arms 26 extend substantially radially from the axis 20A of the pylon 20. The boss 25 is keyed to a ball 20B at the lower end of the pylon 20 to prevent relative rotation between these parts about the axis 20A, as indicated by the key 25A moving in a part-circumferential groove 25B in the ball 20B.

The outer ends of the arms 26 are each respectively pivotally connected to a yoke member 27 on one of the rocket motor nozzles 14 for universal movement, for example by means of a ball and socket joint 40, 40A. The arms 26 thus form secondary attachment points for the rocket motors. The inner ends of the arms 26 are connected to the boss 25 in a manner permitting pivoting of each arm only in a plane containing the longitudinal axis 20A of the pylon 20.

The members 20, 26, 27 connect the motors for pivotal movement about the pitch and yaw axes on rocking displacement of pylon 20 and also for movement in the same rotational sense on rotation of the pylon.

Alternatively the pivotal connections at the ends of the arms 26 could be interchanged.

Flight control and stabilisation of the space vehicle is by altering the angular setting of the rocket motors with respect to the roll axis 17A of the vehicle to vary their directions of thrust. This is achieved by actuators 28, 29 and 31 illustrated in FIGS. 3 and 9.

CONTROL IN PITCH AND YAW

Actuators 28 and 29 for rocking pylon 27 consist of hydraulic jacks whose rams connect by means of a ball and socket joint 30 and a hinge connection 30A to the upper end of the pylon 20. The actuator cylinders are anchored to the fixed structure of the rocket motor mountings as shown diagrammatically at 30C so that the rams act at right angles to one another. Extension and retraction of either ram rocks the pylon 20 about its inner central spherical surface 21 and by means of the arms 26 tilts the rocket motors about their joints 17, so that their directions of thrust produce a turning moment to the vehicle. A position for producing a turning movement is shown in dotted lines in FIG. 1 reference numerals 10'/12', 11'/13'.

ROLL CONTROL

Acturator 31 for rotating pylon 27 is also mounted upon the fixed structure of the motor cluster. It consists of a rotary hydraulic motor, having an inclined swash plate 31A, which is arranged to rotate the pylon about its longitudinal axis to provide control in the roll sense. The motor is of known construction and need not be further described. As the pylon is rotated the arms 26 are also rotated, thereby pivoting the motors so that their directions of thrust produce a rolling moment to the vehicle. Alternatively the actuator 31 may be a hydraulic jacks similar to actuators 28, 29.

COMBINED PITCH, YAW AND ROLL OPERATION

Each actuator can be operated independently of or simultaneously with the other actuators, by known mechanism which need not be further described, to obtain control in all flight conditions.

FIGS. 4 to 7 illustrate the method of transferring rotary motion from the roll actuator 31 to the pylon 20, whilst still preserving the ability of the pylon to tilt under the action of the pitch and yaw actuators 28 and 29. The spherical surface 21 formed on pylon 20 is supported by a housing 22 which contains a bearing shell 36 mounted within two ball races 34 and 35. The housing 22 is fixedly located by members 23, and in addition to the pylon 20 it also supports the roll actuator 31. The actuator 31 imparts limited rotary movement to a worm shaft 32, the worm shaft 32 meshing with a gear segment 33 attached to the bearing shell 36. The actuator 31 is thus capable of rotating the bearing shell 36 through a limited angle in either direction. This rotary movement is transferred to the pylon 20 by means of a pin 37 (see FIG. 7), fixed to the bearing shell 36 and cooperating with an axially extending groove 37A formed in the spherical surface 21. Rotary motion is thus transferred in any angular position of the pylon 20 caused by the pitch and yaw actuators.

The motors need not be symmetrically disposed about a plane containing the roll axis of the vehicle but are preferably so symmetrically disposed.

There could be three motors each located on a diametrical plane between the other two provided the connection means could be arranged to clear the motors in all conditions of movement.

The invention is primarily applicable to piloted space transport vehicles having engines which are not only automatically controlled but can also be controlled by the pilot, but also is applicable to ballistic missiles and satellite launchers.

The described arrangements have the merit of simplicity compared with known proposals, and therefore have greater reliability. This facilitates pilot control.

I claim:

1. In a rocket-powered vehicle, a power plant comprising a fixed part (18) and at least one rocket motor (10, 13) on each side of a plane containing the roll axis (17A) of the vehicle, a connection (17) between each motor and said fixed part (18), each connection (17) permitting pivotal movement of the associated motor about both the pitch and yaw axes of the vehicle, means (20, 26, 27) connecting the motors together for producing pivotal movement of the motors about one or both of the pitch and yaw axes on displacement of the connecting means relative to the fixed part, and for producing pivotal movement of the motors together in the same rotational sense around the roll axis of the vehicle on rotation of the connecting means, and three actuators operatively connected to the connecting means, the first and second for displacing said connecting means for effecting pivotal movement of the motors about the pitch and yaw axes respectively and the third for rotating the connecting means for effecting pivotal movement around the roll axis of the vehicle.

2. In a rocket-powered vehicle as claimed in claim 1, in which there are two motors on each side of the said plane, the four motors being equally angularly spaced about the roll axis of the vehicle.

3. In a rocket-powered vehicle as claimed in claim 1, in which the connecting means comprises a structural extending generally longitudinally substantially along the roll axis of the vehicle, which structure is mounted intermediate its ends, for universal movement, one end of the structure having a substantially radially extending arm for each motor means pivotally connecting the arms to the structure and to the motors to allow the arms to pivot in a plane containing the structure axis.

4. A power plant as claimed in claim 3, in which the arms are connected to one end of the structure and two of the actuators are mounted to act on the other end of the structure at right angles to each other and the third actuator is mounted to rotate the structure about its axis.

5. A power plant as claimed in claim 4, in which the two actuators are hydraulic jacks.

6. A power plant as claimed in claim 4, in which the third actuator is a rotary hydraulic motor.

References Cited

UNITED STATES PATENTS

| 2,981,501 | 4/1961 | Schaefer | 244—52 |
| 3,147,591 | 9/1964 | McEwen | 244—3.22 X |
| 3,208,695 | 9/1965 | Aruta | 244—56 X |

MILTON BUCHLER, Primary Examiner

J. E. PITTENGER, Assistant Examiner

U.S. Cl. X.R.

60—228; 239—265.23; 244—56, 75, 3.22